United States Patent [19]

Engel et al.

[11] Patent Number: 4,646,082

[45] Date of Patent: Feb. 24, 1987

[54] INBOUND ACKNOWLEDGEMENT STACK

[75] Inventors: James R. Engel, Sleepy Hollow; Michael A. Stepien, Hoffman Estates; Keith J. Glidewell, Arlington Heights, all of Ill.

[73] Assignee: Motorola, Inc., Schaumburg, Ill.

[21] Appl. No.: 651,194

[22] Filed: Sep. 14, 1984

[51] Int. Cl.[4] .................. G08B 5/22; G08B 23/00; G08B 26/00; H04Q 7/00
[52] U.S. Cl. .................. 340/825.54; 340/825.44; 340/502; 340/505
[58] Field of Search ............. 340/825.54, 311.1, 313, 340/825.44, 502, 504, 505; 179/2 EC, 18 BF; 455/56; 370/94, 94 V

[56] References Cited

U.S. PATENT DOCUMENTS

| 4,199,661 | 4/1980 | White et al. | 370/91 |
| 4,232,294 | 11/1980 | Burke et al. | |
| 4,342,995 | 8/1982 | Shima | 340/825.5 |
| 4,445,214 | 4/1984 | Reynolds et al. | 370/94 |
| 4,517,561 | 5/1985 | Burke et al. | 179/2 EC |
| 4,517,669 | 5/1985 | Freeburg et al. | 370/82 |
| 4,519,068 | 5/1985 | Krebs et al. | 370/82 |

FOREIGN PATENT DOCUMENTS

0164338  9/1983  Japan ................. 340/311.1

Primary Examiner—John W. Caldwell, Sr.
Assistant Examiner—David W. Olson
Attorney, Agent, or Firm—Joseph T. Downey; Anthony B. Sarli; Donald B. Southard

[57] ABSTRACT

In a data message communication system, certain messages require a return acknowledgement signal. The present invention contemplates a method and means which are activated whenever an outbound message is received. Each portable unit which receives a message then monitors the outbound communication channel to determine if the inhibit signal is currently active. If the inhibit is not currently active, the particular unit will transmit its acknowledgement message immediately. If the inhibit signal is active, each portable unit will maintain a count of the number of outbound messages, addressed to other units requiring an acknowledgement, since that particular portable received its message. At the termination of the inhibit signal, each portable unit will pause for a period equivalent to the product of the acknowledgement message time slot multiplied by count of messages accumulated since the receipt of the particular portable units message. Each portable unit will then transmit an acknowledgement signal at the termination of its unique pause period.

5 Claims, 7 Drawing Figures

Fig. 7 ated from the fixed end by a "general communications controller" which organizes and generates the various message signals which are transmitted as a single packet of information over the operating channel of the system. Each portable unit which receives an information message from the general communications controller is required to reply with an acknowledgement signal. The general communications controller will repeat its message transmissions to the various portable units until an acknowledgement message has been received. A portable unit transmitting a long inbound message prevents other portable units from sending acknowledgement messages. The consequence is often several portable units having pending acknowledgements to transmit their respective acknowledgement messages simultaneously thus creating mutually interfering signals at the termination of inhibit. In order to reduce the incidence of two portable units transmitting at the same time and mutually interfering with each other, inhibit information imbedded in the outbound data stream orders other portable units to refrain from beginning a possibly interfering transmission when one is in progress. A difficulty exists in that during a long inhibit period, several portable unit may receive an outbound message and thus be ready to transmit an acknowledgement signal as soon as the inhibit signal is removed. In prior art systems of this type, there is no means to prevent the simultaneous transmission of acknowledgement signals after a period of a relatively long inhibit.

INBOUND ACKNOWLEDGEMENT STACK

BACKGROUND OF THE INVENTION

This invention relates to the field of radio transport of alphanumeric messages to and from handheld terminal units, mobile units and fixed installations, and specifically to a method and means for coordinating the transmission of return acknowledgement messages in a transmission scheme wherein certain messages require a return acknowledgement message. The present application is related to the instant assignee's U.S. Pat. No. 4,481,670 issued Nov. 6, 1984, entitled "Method and Apparatus for Dynamically Selecting Transmitters for Communications Between a Primary Station and Remote Stations of a Data Communications System" and invented by Thomas A. Freeburg, U.S. patent application Ser. No. 603,399 filed Apr. 24, 1984 entitled "Data Communications System Transmitter Selection Method and Apparatus" and invented by Stuart W. Thro, and Ser. No. 627,270 filed July 2, 1984 entitled "Self-Calibrating Signal Strength Detector", also invented by Stuart M. Thro.

DESCRIPTION OF PRIOR ART

Portable Data terminal systems have developed as a means of providing data message communications over a conventional radio-frequency (RF) link and as a means of coupling computers and terminals which are operated at remote locations to host computers which may be used, among other things, to provide operational command and control for a public service agency or the like. Data communication systems of this type typically transmit and receive on separate frequencies but the operation of each portable unit is limited to those signal transmit and receive frequencies. The oper-

SUMMARY OF THE INVENTION

Accordingly, it is an object of the present invention to provide a method and means to prevent mutual interference among acknowledgement message transmissions.

It is yet another object of the present invention to provide a method and means to improve system reliability by insuring that a particular portable unit transmits its acknowledgement signal in a unique time slot.

It is still another object of the present invention to provide a mutual interference preventing control method for the transmission of acknowledgement message signals which is independent of the general communications controller.

It is yet another object of the present invention to increase the message transport capability of a portable data system by avoiding long delays for the transmission of acknowledgement message signal.

Briefly described, the present invention contemplates a method and means which are activated whenever an outbound message is received. Each portable unit which receives a message then monitors the outbound communication channel to determine if the inhibit signal is currently active. If the inhibit is not currently active, the particular unit will transmit its acknowledgement message immediately. If the inhibit signal is active, each portable unit will maintain a count of the number of outbound messages, addressed to other units requiring an acknowledgement, since that particular portable received its message. At the termination of the inhibit signal, each portable unit will pause for a period equivalent to the product of the acknowledgement message time slot multiplied by count of messages accumulated since the receipt of the particular portable units message. Each portable unit will then transmit an acknowledgement signal at the termination of its unique pause period.

DETAILED DESCRIPTION OF THE DRAWINGS

Figure 1:
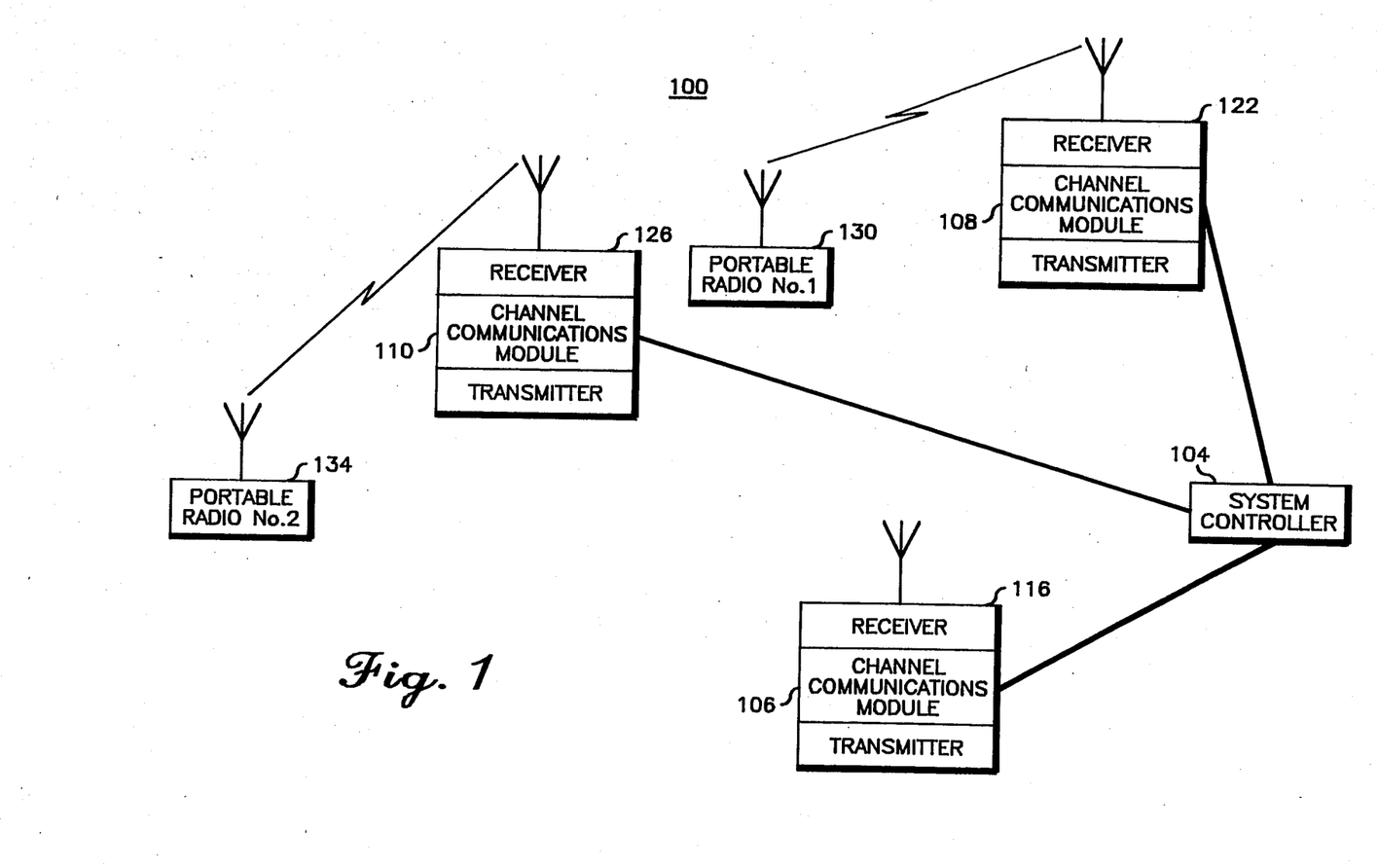
FIG. 1 is a block diagram of a data communications system that may advantageously utilize the present invention.
Figure 2:
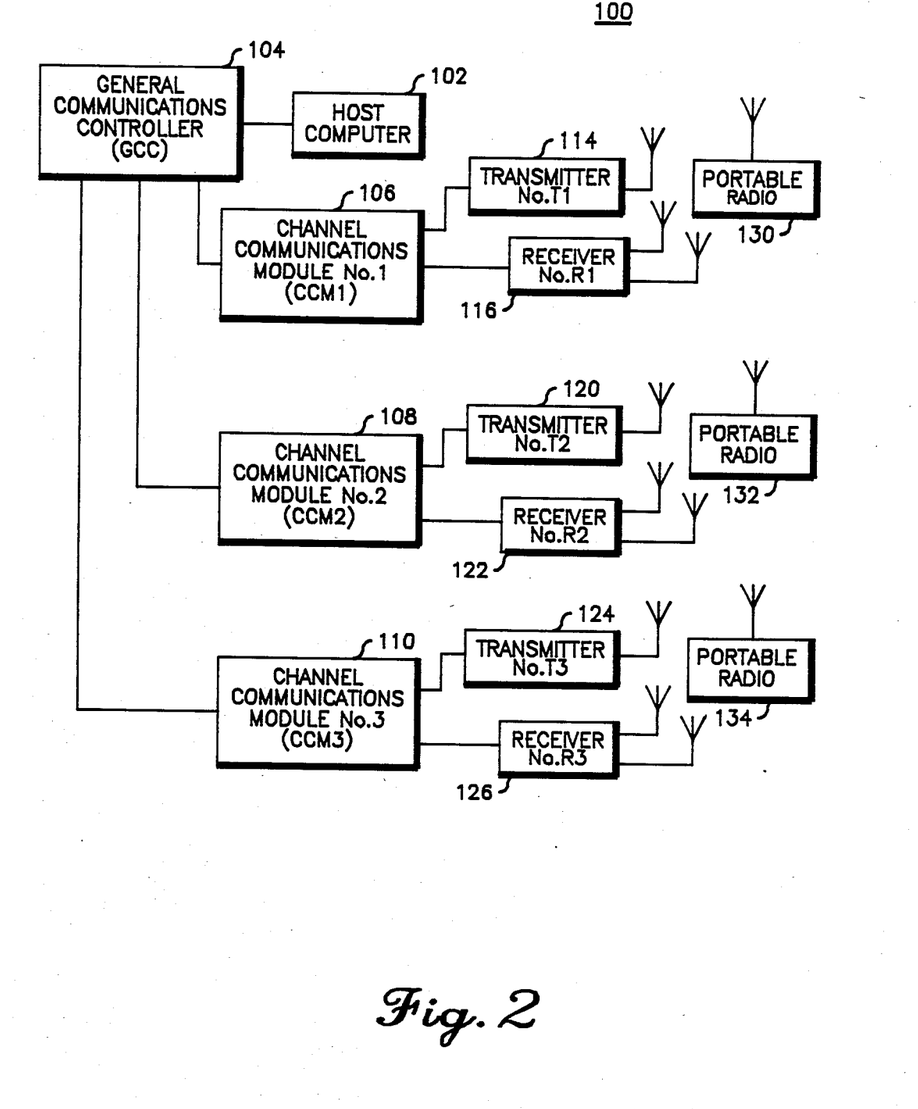
FIG. 2 is another block diagram of a data communications system that advantageously utilize the present invention.

Referring now to FIGS. 1 and 2, there is shown a block diagram of a data communications system of the type which may advantageously utilize the present invention. This type of system transmits alphanumeric messages between a primary station, such as a general communications controller (GCC) 104, by way of a communications medium such as a radio frequency (RF) communications channel to a plurality of remote stations, such as portable radios 130, 132 and 134. Although described in the context of a data only communications system, both data signals and analog signals such as voice can be communicated over the RF communications channel to the portable radios 130, 132, 134. Since the data communications system spans a larger geographical area than can be covered with a single base station site, there is a need for a plurality of such sites. Located throughout the geographical area are a number of base station sites each including a channel communications module (CCM) 106, 108 and 110, an RF signal transmitter 114, 120 and 124 and an RF signal receiver 116, 122 and 126, respectively. These transmitter/receiver pairs 114 and 116, 120 and 122, and 124 and 126 may operate on separate or the same antenna systems located therewith.

The RF communication channel is preferably comprised of first and second carrier signals which may be modulated with message signals. Transmitters 114, 120 and 124 may be operative on the first carrier signal, while receivers 116, 122 and 126 may be operative on the second carrier signal of the radio communications channel. Transmitters 114, 120 and 124 and receivers 116, 120 and 126 may be any suitable commercially available transmitters and receivers such as those described in Motorola Instruction Manual 68P81013E65, 68P81060E30 or 68P81049E45. CCM's 106, 108 and 110 are typically co-located with their corresponding transmitters and receivers and may be of the type shown and described in Motorola Manual No. 68P81063E30.

Portable radios 130, 132 and 134 are preferably portable radios of the type shown and described in Motorola Manual No. 68P81035C35, or may be commercially available mobile radios hand-held portable radios of the type shown and described in U.S. Pat. Nos. 3,906,166 and 3,962,553 and in patent application Ser. No. 187,304, entitled "Microprocessor Controlled Radio-Telephone Transceiver," filed Sept. 15, 1980 and invented by Larry C. Puhl et al. (all incorporated herein by reference). Portable radios 130, 132 and 134 may be any suitable commercially available conventional transmitter and receiver, such as, for example, the receiver described in Motorola Instruction Manuals No. 68P81035C35, 68P81039E25 and 68P81014C65. These and the aforementioned Motorola Instruction Manuals are incorporated herein by reference and may be obtained from the Service Publications Department of Motorola, Inc., 1303 East Algonquin Road, Schaumburg, Ill. or from Motorola C & E Parts, 1303 East Algonquin Road, Schaumburg, Ill.

GCC 104 of the data communications system in FIG. 1 may be coupled to a host computer 102 which may control a number of GCC's 104 that are located in different geographical areas such as, for example, different cities. Thus, host computer 102 may gather data from, and dispatch data to, portable radios located in several different cities. GCC 104 may be coupled to host computer 102 and CCM's 106, 108 and 110 by means of commercially available modems and associated dedicated telephone lines.

GCC 104 in FIG. 1 transmits message signals to and receives message signals from portable radios 130, 132 and 134. The message signals may include coded data packets wich each may contain a binary preamble, a predetermined synchronization word and an information field containing a command, status or data. Typically, each of these message signals requires that the various portable units respond with an acknowledgement message by sending an acknowledgement signal on the inbound communications channel. The format of the data packets is preferably described in the instant assignee's U.S. patent applications Ser. No. 402,682, entitled "Data Signalling System," filed July 28, 1982 and invented by Timothy M. Burke et al.; Ser. No. 512,801, entitled "Method and Apparatus for Communicating Variable Length Messages," filed July 11, 1983 and invented by Jay Krebs et al.; and in Ser. No. 512,800, entitled "Method and Apparatus for Coding Messages Communicated between a Primary Station and Remote Stations of a Data Communication System," filed July 11, 1983 and invented by Thomas A. Freeburg et al., all incorporated herein by reference. Other suitable data formats may be any of a number of existing data formats, such as, for example, those described in U.S. Pat. Nos. 3,906,445; 4,156,867; and 4,354,252, all incorporated herein by reference.

Message signals are routed by GCC 104 to a selected CCM 106, 108 and 110 for transmission by its co-located transmitter. Since the message signals may be transmitted on one or several transmitters simultaneously, as in simulcast systems of the type disclosed in U.S. Pat. No. 4,188,522, it is necessary that GCC 104 have a means for determining which of the base station transmitters 114, 120 or 124 should be used to deliver message signals to selected portable radios 130, 132 or 134. The improved method and apparatus of the present invention enables the receivers 116, 122 and 126 to dynamically alter the receiver sensitivity threshold so that RF signal strength readings are sufficiently accurate to permit meaningful comparative analysis of data received from many different locations, thus enabling the GCC 104 to dynamically make these routing decisions.

According to an important feature of the present data system, two or more of the transmitters 114, 120 or 124 can be operated for communicating with different portable radios provided that transmissions from the various transmitters do not interfere with reception by each portable radio receiver of its desired signal. As a result, data throughput of the data communications system illustrated in FIGS. 1 and 2 can be significantly increased by re-use of the RF communications channel. In other words, by taking advantage of re-use, a single RF communications channel can serve thousands of portable radios in a geographical area covering several states and their major cities.

Figure 3:
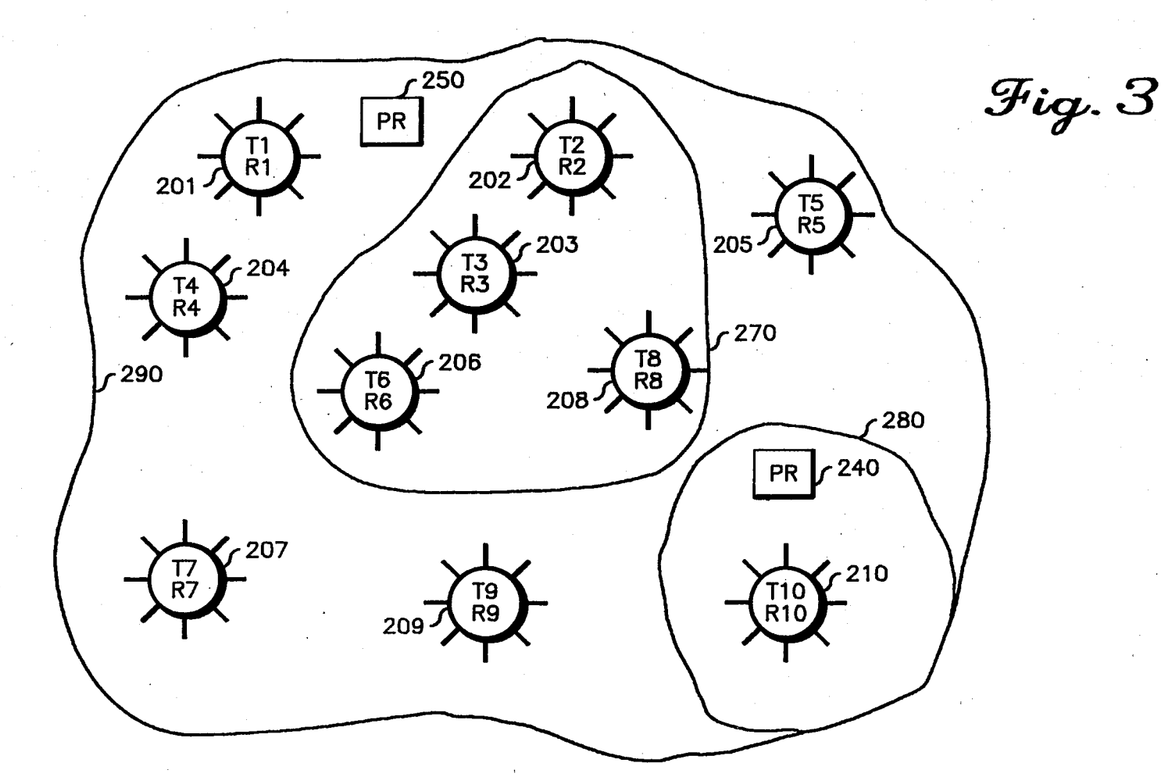
FIG. 3 is a diagram of a geographic area covered by ten base stations.

Referring to FIG. 3, there is illustrated a geographical area 290 of a data communications system that includes ten base station sites 201–210 and corresponding co-located transmitters T1–T10 and receivers R1–R10. As shown in FIG. 3, the data communications system of the present invention includes multiple portable units. Therefore, the possibility exists that several portable units may be operative simultaneously, thus creating the possibility of mutually interfering transmissions. As an example of one type of activity of this system, shown are two portable radios 240 and 250. Each time a portable radio transmits, signal strength measurements are taken by receivers R1–R10. These signal strength numbers are transferred by the CCM's at each site 201–210 to GCC 104.

The signal strength measurements (SSI) taken by receivers R1–R10 in FIG. 3 can be used to estimate the radio channel path loss between the portable radios and the base station sites 201–210 by subtracting the signal strength levels SSI received by the base station receivers from the portable radio transmitter power (a known number preprogrammed into the GCC). GCC 104 can combine this path loss estimate with programmed information pertaining to base station transmit powers, antenna configurations etc., to determine the signal strength or power level RSS each transmitter T1–T10 is able to deliver each portable radio receiver. Further operation of the data communications system of FIGS. 1, 2, and 3 is described further below as well as in the above-mentioned references.

Figure 4:
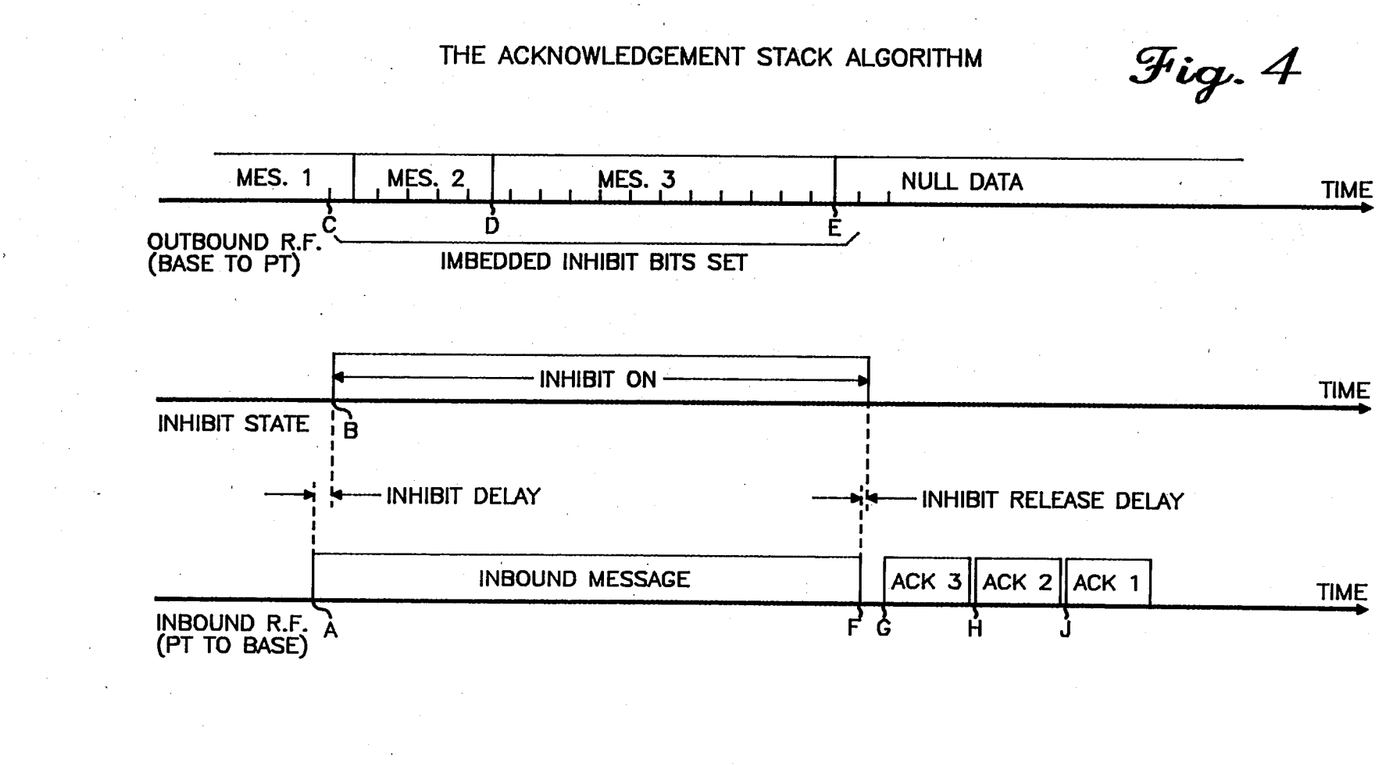
FIG. 4 is a timing diagram showing the relationship between transmitted messages, inhibit, and the subsequent acknowledgement signals.

Referring now to FIG. 4, there is shown a timing diagram detailing the relationship between outbound messages, inhibit, and subsequent acknowledgement signals. According to FIG. 4, an outbound transmission may be comprised of a series of messages which are transmitted in a serial fashion. The transmission on the outbound channel may be preceded by a sync or clock signal which is used to synchronize the decoding circuitry of the portable terminal unit to the relative timing of the received data transmission. If another portable unit is communicating on the inbound channel, to the general communications controller, an imbedded inhibit will become active in the outbound data stream at the end of message one. The relationship between inhibit and the outbound message signal is shown on line 2 of FIG. 4. According to the teachings of the present invention, each portable terminal with a pending acknowledgement "knows" that subsequent outbound message transmissions create pending acknowledgements in other portable terminals. Thus, each portable terminal is required to count "outbound message ends" and allow time for the inbound acknowledgements when inhibit ends, that is, observe a "virtual inhibit period" at the transition to the not inhibited state in the outbound data stream. In this way, each portable terminal uses the information it has gained from observation of the outbound frequency to provide an orderly transmission of inbound acknowledgements at the end of inhibit.

To permit more than one outbound message to complete during an inhibit period without creating contention among multiple pending inbound acknowledgements, the system uses a "push down inbound acknowledgement stack." Each portable unit that receives a message will, at the end of the outbound message transmission, determine whether inhibit is in effect. If not, the acknowledgement will immediately be transmitted.

Referring still to FIG. 4, line 3 shows the timing relationship between inhibit and the subsequent transmission of acknowledgement signals. As mentioned above, if inhibit is in effect at the end of the outbound message, the portable unit will continue to monitor the outbound channel for the end of inhibit. Each time a message synch sequence and then a message for another portable unit is observed, an acknowledgement counter (ASC) in the portable unit will increment. At the end of inhibit, the acknowledgement will transmit immediately if the ASC counter is set to zero, as is the case with acknowledgement 3.

Alternatively, the other portable units pause for a delay period equal to the value of the ASC counter multipled by the "Acknowledgement Slot Time" (AST), which is 50 ms. in the preferred embodiment of the present invention. Thus, since the ASC counter in the portable unit which received message 2 is set to 1 (message 3 was subsequent to message 2), acknowledgement 2 will be transmitted approximately 50 ms. after the termination of inhibit. In a similar fashion, the portable unit which received message 1 will transmit its acknowledgement 100 ms. after the termination of inhibit (ASC=2).

By way of review, the operation of the present invention is best described in conjunction with FIG. 4 and in the context of the following sequence. An inbound message from a portable terminal begins the sequence as shown at 'A' in FIG. 4. After a brief delay, caused by the general communications controller data detect, and the portable terminal inhibit signal detect, the portable units become inhibited at 'B'. As shown in FIG. 4, message 1 is received by terminal 1, however, since inhibit became active before the end of message 1 at 'C', portable terminal 1 refrains from transmitting its acknowledgement signal. As shown at 'D', message 2 is received by both portable unit 2 as well as portable unit 1. At the end of message 2, as shown at 'D', portable unit 1 increments its acknowledgement stack by 1, and both units 1 and 2 remain inhibited from transmitting their respective acknowledgement signals. Referring now to 'E', at this point message 3 completes. At this point, units 1 and 2 increment their respective acknowledgement stack counters by 1. Therefore, at the end of message 3, portable unit 1 will have an acknowledgement stack counter value of 2, portable unit 2 will have an acknowledgement stack counter value of 1, and portable unit 3 will have an acknowledgement stack counter value of 0. When the inbound message ends at 'F', the inhibit signal is released from the portable units after a brief inhibit release delay. At this time, the portable units will transmit their respective acknowledgement signals in accordance with the algorithm of the present invention. Therefore, since portable unit 3 has the lowest value stored in its acknowledgement stack counter, it will transmit its acknowledgement message at 'G'. Similarly, portable units 2 and 1 transmit their acknowledgement signals at 'H' and 'J', respectively, in accordance with the values stored in their respective acknowledgement stack counters.

According to the preferred practice of the present invention, each portable unit schedules its acknowledgement transmission after a delay equal to the ASC count times the AST period. At this moment, the time period for transmission of acknowledgement signals is irrevocable. That is, that further inhibit signals are assumed to be caused by other portable signals sending their respective acknowledgement signals, and are therefore ignored. An important feature of the present invention, therefore, is that acknowledgement signals are transmitted on a "last in, first out" basis.

Figure 5:
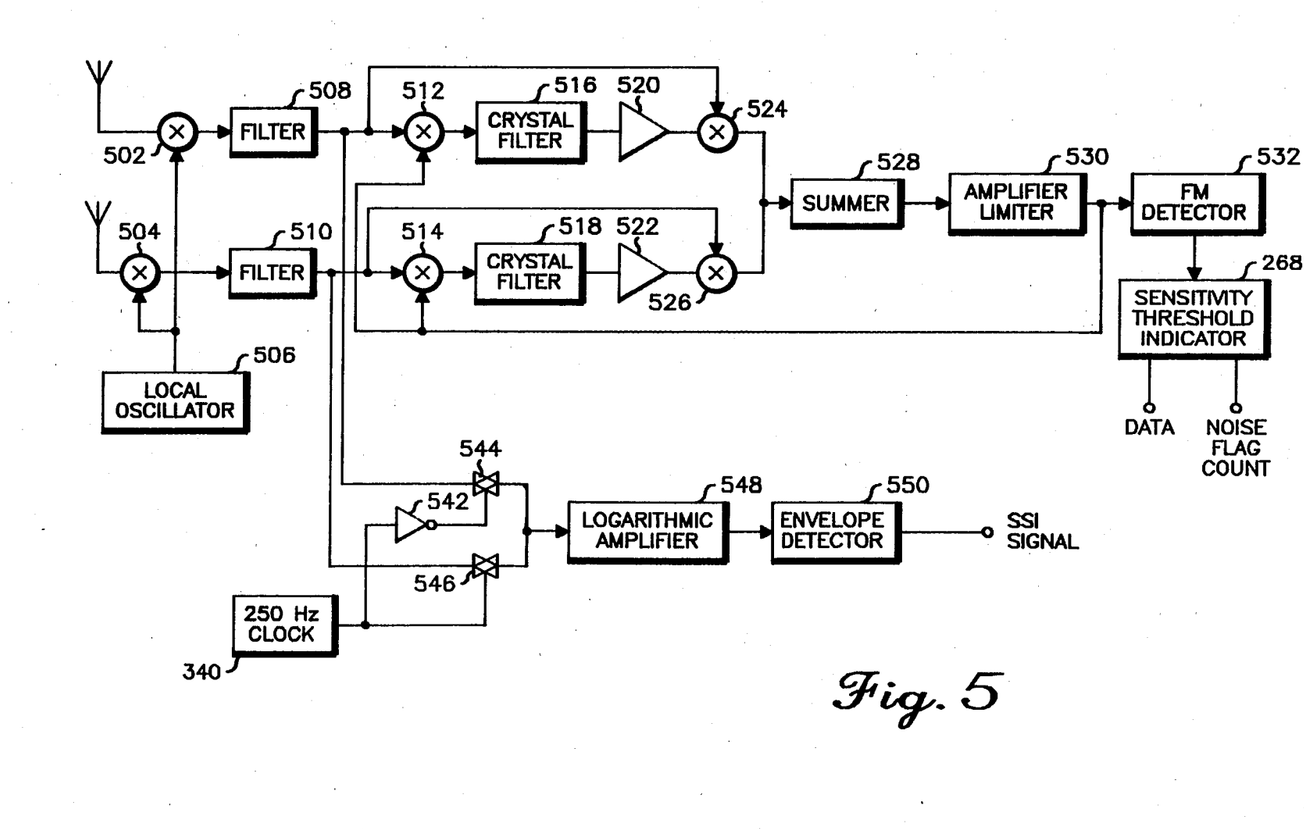
FIG. 5 is a schematic diagram of a receiver circuit of the type which may be used in the data communications system of the present invention.

Referring now to FIG. 5, there is illustrated a detailed circuit diagram of the receiver portion of portable radios 130, 134 and 132 associated with CCM's 106, 108 and 110 in FIGS. 1 and 2. Each receiver preferably includes two antennas spaced at a predetermined distance from another and a maximal ratio predetection diversity combiner 512, 514, 516, 518, 520, 522, 524, 526 and 528 for combining the signals received by each of the antennas. The space diversity provided by the two antennas is utilized to prevent degradation in communications which results when an antenna is located in an RF signal null. Although optional, the use of diversity minimizes reception of errors in the incoming data and also enhances accuracy of the path loss estimates since it reduces variations on signal levels. Rapid and deep RF signal nulls, called Rayleigh fading, are experienced more frequently in communications systems operating at RF signal frequencies in the new 800 to 900 MHz frequency range. The maximal ratio predetection diversity combiner cophases the RF signals to provide a composite signal having components that are proportional to the square of the RF signals from each antenna. Therefore, strong signals are emphasized much more than weak signals. In other words, communications are not adversely affected if a very weak signal is received by one antenna and a reasonably good signal is received by the other antenna.

In the diversity receiver in FIG. 5, the frequency of local oscillator 506 determines which radio channel to which the diversity receiver is tuned. The RF signal received by each antenna is combined by mixers 502 and 504 with the signal from local oscillator 506 to provide corresponding IF signals. The IF signal from mixers 502 and 504 is then applied to IF bandpass filters 506 and 510, respectively, which may be a monolithic bandpass filter of conventional design similar to that described in U.S. Pat. No. 3,716,808 (incorporated herein by reference). The filtered IF signals from filters 508 and 510 are split and fed forward via two paths to mixers 512, 524 and 514, 526, respectively. First portions of the IF signals are applied to mixers 524 and 526, and second portions of the IF signals are applied to mixers 512 and 514 together with the composite IF signal which is fed back from amplifier 530. By feeding back the composite IF signal, the IF strip of the diversity receiver forms a closed feedback loop that is regenerative on noise. Thus, the randomly varying phase of the IF signals from filters 508 and 510 relative to the composite IF signal is added into the closed loop via mixers 512 and 514 and then subtracted out at mixers 524 and 526, respectively. By this process, the random phase variations are removed from the IF signals in relation to the composite IF signal. The result is that each of the IF signals is cophased to the composite IF signal.

The product signals from mixers 512 and 514 at the difference frequency are applied to filters 516 and 518, respectively, which each provide a variable phase shift. Filters 516 and 518 may be two-pole crystal filters. The signals from filters 516 and 518 are linearly amplified to the second input of mixers 524 and 526, respectively. Mixers 524 and 526 multiply the signals from amplifiers 520 and 522, respectively, with the IF signals from filters 508 and 510, respectively, to provide product signals that are co-phased with the composite IF signal. The product signals from the mixers 524 and 526 are linearly added by summer 528 to form one composite IF signal. The composite IF signal may be coupled via amplifier 530 to a conventional FM detector 532 which has an output signal providing demodulated message signals. The output signal of FM detector 532 is coupled to its corresponding CCM 106, 108 or 110 in FIG. 1. The output of FM detector 532 is further coupled to the input of the sensitivity threshold indicator 268 of FIG. 5, in this case a bit noise flag generator which is described in detail in conjunction with FIGS. 5 and 6. Further details of the circuitry in the diversity receiver in FIG. 5 are illustrated and described in the instant assignee's co-pending U.S. patent applications, Ser. No. 22,757 (now U.S. Pat. No. 4,369,520), filed on Mar. 22, 1979, entitled "Instantaneously Acquiring Sector Antenna System," and invented by Frank J. Cerny, Jr., and James J. Mikulski, and in Ser. No. 268,613 filed on June 1, 1981, entitled "Large Dynamic Range Multiplier for a Maximal Ratio Diversity Combiner," and invented by Frank J. Cerny, Jr., both incorporated herein by reference.

FIG. 5 also illustrates the circuitry 340, 542, 544, 546, 548 and 550 comprising the signal strength detector that is located in the receivers. Logarithmic amplifier 548 is switchably coupled to the signals from filters 508 and 510 by clock 340 and gates 542, 544 and 546 and provides a composite signal which is coupled to envelope detector 550. Envelope detector 550 provides an SSI signal that is proportional to the maxima of the composite signal from amplifier 548 and also time averaged to smooth variations. Amplifier 548 should preferably be a log-amplifier to provide for both extended dynamic range and logarithmic weighting which simplifies the GCC computations. A separate amplifier 548 and envelope detector 550 can be provided for each of the signals from filters 508 and 510 if it is desired to measure each separately. The SSI signal from envelope detector 550 is coupled to its corresponding CCM 106, 108 or 110 in FIG. 1, where it is digitized. Suitable signal strength detecting circuitry is described in detail in the instant assignee's co-pending patent application Ser. No. 505,625, filed June 20, 1983, entitled "Diversity Signal Strength Indicator and Site Selection Apparatus for Using Same," invented by Karl R. Brusen, and incorporated herein by reference. Many other types of commercially available signal strength detecting circuitry can be utilized in place of clock 340, gates 542, 544 and 546, amplifier 548 and envelope detector 550.

Figure 6:
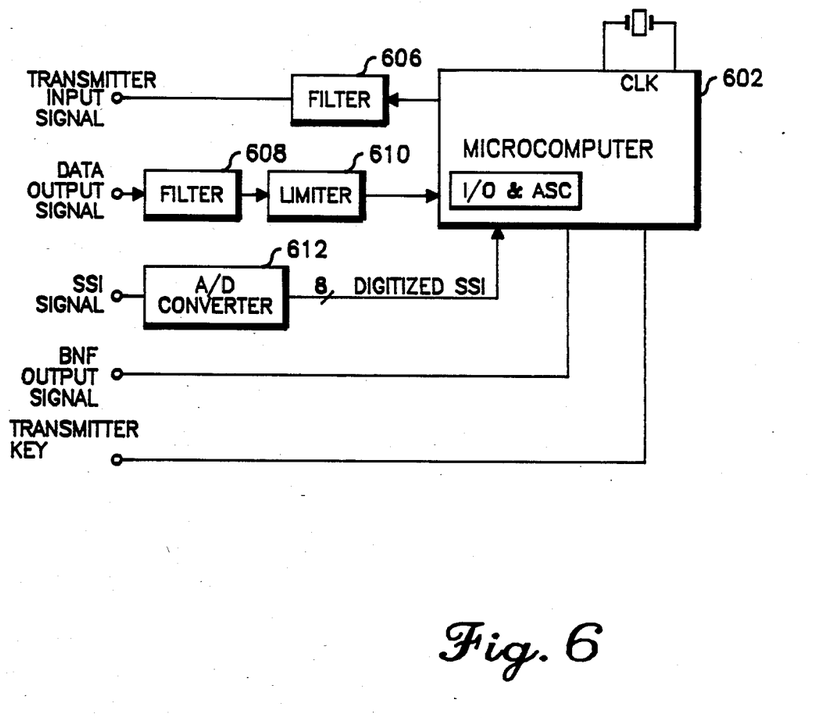
FIG. 6 is a schematic diagram of the data processing portion of the receiver of FIG. 5.

FIG. 6 is a block diagram of the data processing portion of the portable receivers shown in FIG. 2. As mentioned above, each portable unit is provided with a receiver, transmitter, and data processing portion. Each data processing portion includes a microcomputer 602 having a memory with a stored program therein for communicating with and decoding messages from GCC 104 in FIG. 2. In addition, microcomputer 602 includes a memory with a stored program therein for implementing the acknowledgement message transmission algorithm of the present invention. Microcomputer 602 can be any suitable commercially available microcomputer such as, for example, the Motorola type MC6800, MC6803 or MC68000 microprocessor, or those microprocessors described in U.S. Pat. Nos. 4,030,079 and 4,266,270.

Message signals received by microcomputer 602 from the receiver of FIG. 5, may be coupled in to filter 606 and thereafter operated on to control its corresponding transmitter. The transmitter is turned on (active) and off (inactive) by means of a transmitter key signal provided by microcomputer 602. The message signals may be coded according to frequency-shift keying, phase-shift keying or any other suitable existing encoding scheme. Suitable message signal encoding schemes are described in the aforementioned U.S. Pat. Nos. 3,906,445, 4,156,867, and 4,354,252. Message signals received by portable radios from the base station are processed by a receiver sensitivity threshold indicator or bit noise flag generator which is coupled to a microcomputer 602 I/O input.

Microcomputer 602 also takes signal strength readings while it is receiving its message signals. The SSI signal from its corresponding receiver is coupled to A/D converter 612, which may continuously convert the analog SSI signal to a digitized SSI signal. The digitized SSI signal from A/D converter 612 is applied to an input port of microcomputer 602. Several A/D conversions are performed while a message signal is being received. The digitized SSI signal for the several conversions are averaged by microcomputer 602. The output of bit noise flag generator 268 is also coupled to an input port of microcomputer 602 which analyzes the bit noise flags in conjunction with the digitized SSI signal.

In the course of normal system operation, the local processor 602 receives data from the receiver of FIG. 5 and decodes messages which are displayed to the portable unit users. Microcomputer 602 also monitors the outbound data stream for other activity on the outbound communications channel and controls the tranmission of acknowledgement signals in accordance with the teachings of the present invention.

Figure 7:
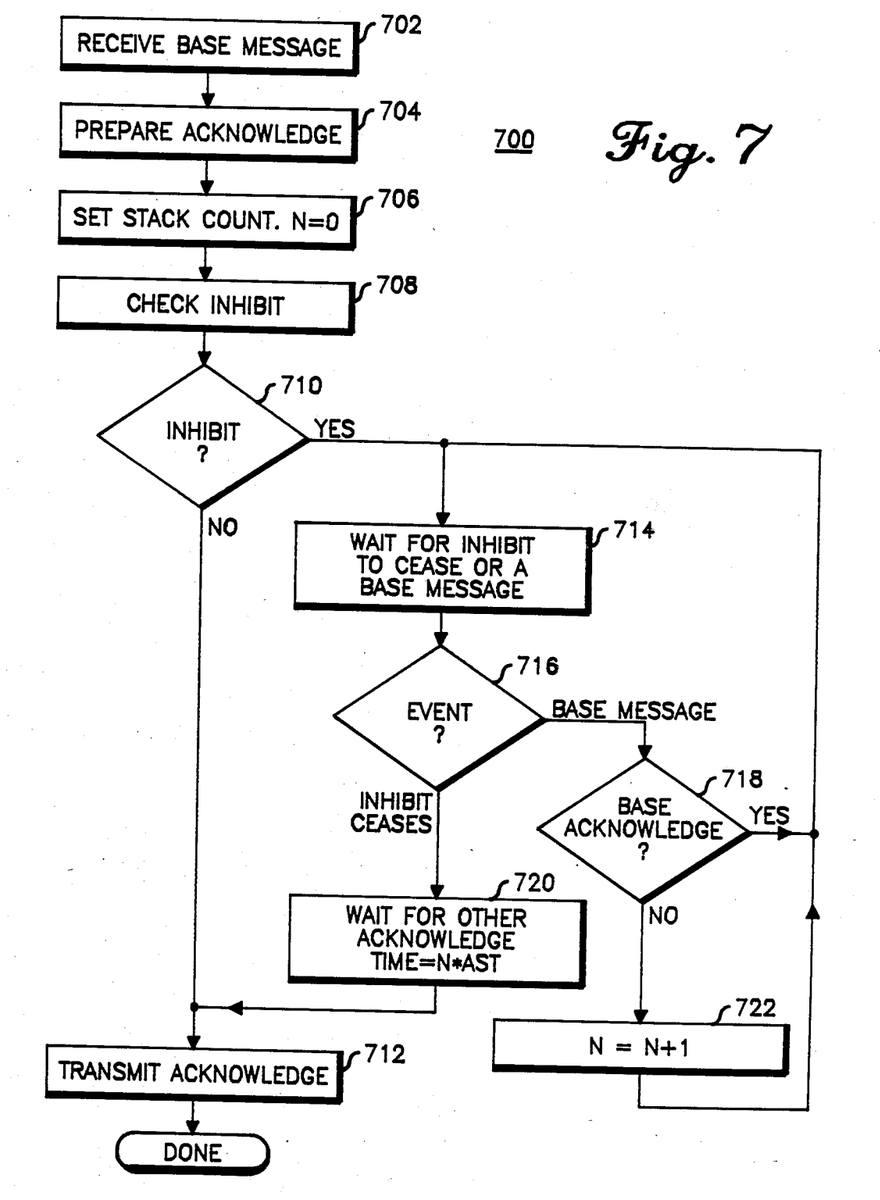
FIG. 7 is a flow diagram detailing the operation of the processor of FIG. 6 in accordance with the teachings of the present invention.

Referring now to FIG. 7, there is shown a flow diagram which details the operation of the processor described in conjunction with FIG. 6. According to FIG. 7, item 702 is selected whenever base to portable message is received by the portable unit. Item 704 then prepares the portable unit to transmit its acknowledgement by first checking to verify that the received message is of good integrity. In addition, item 704 examines the incoming data packet to determine whether the received message is designated for that portable unit as well as ascertaining whether the particular message requires an acknowledgement. Item 706 then initializes the acknowledgement stack counter (ASC) which retains the current value of the number of acknowledgements which must be issued before that particular unit transmits its acknowledgement signal. Item 708 then examines the outbound data stream to determine whether an inhibit is currently in effect. If inhibit is not currently active, decision 710 will select item 712 which causes the particular radio to transmit its acknowledgement signal before returning program control to item 702. If an inhibit is currently active, decision 710 selects item 714 which senses the outbound message channel to determine whether the inhibit signal is currently active or whether another outbound message is present on the outbound data channel. If another message is detected, decision 716 selects decision 718 which determines whether the base message requires an acknowledgement. If the current message does not require an acknowledgement, decision 718 selects item 714 which monitors the inbound data stream for the next message. If the current message requires an acknowledgement, decision 718 selects item 722 which increments the acknowledgement stack counter before selecting item 714, to monitor the inbound data stream for the next message.

In summary, a method and means for controlling the transmission of acknowledgement signals has been described. The present invention examines the outbound data stream to determine whether an inhibit is in effect after the receipt of a message. If the inhibit is not in effect, the portable unit immediately transmits its acknowledgement signal. If inhibit is in effect, the portable will accumulate the number of messages, which require an acknowledgement, subsequent to the message designated for that particular portable unit. Each portable unit then pauses for a period equivalent to the product of the acknowledgement slot time times the accumulated number of subsequent messages requiring an acknowledgement. At the termination of the pause period, each respective portable unit transmits its respective acknowledgement signal. Accordingly, other uses and modifications of the present invention will be obvious to one skilled in the art without departing from the spirit and scope of the present invention.

I claim:

1. A method for sequencing acknowledgement messages of a predetermined duration, transmitted from portable or mobile units to a base station in an RF communication system wherein said base station provides inbound and outbound communications channels having data streams wherein an imbedded inhibit signal becomes active in the outbound data stream in the presence of activity on the inbound communications channel, said method comprising the steps of:
    (a) receiving an outbound message addressed to a particular mobile unit, said outbound message requiring an acknowledgement of a predetermined duration;
    (b) sensing the outbound RF communication channel to determine whether a transmit inhibit is currently active;
    (c) transmitting said acknowledgement if said inhibit is not in effect;
    (d) observing and counting the number of outbound messages requiring an acknowledgement subsequent to receiving said outbound message;
    (e) pausing for a period equivalent to the product of the acknowledge message duration and the number of observed and counted outbound messages subsequent to the receipt of said outbound message addressed to a particular mobile unit wherein said pause period begins at the termination of the imbedded inhibit signal; and
    (f) transmitting a particular unit's acknowledgement signal at the termination of the pause period.

2. A method for controlling message traffic on a data communications system having a number of remote units and at least one fixed unit, wherein messages are communicated on inbound and outbound message channels, between said fixed and said portable units, and outbound messages may be transmitted in a serial packet from said fixed unit to said portable units on said outbound message channel, said method including the steps of:
    (a) receiving a coded message on said outbound message channel, said coded message addressed to a particular remote unit wherein said coded messages require an acknowledgement message of a predetermined time period;
    (b) sensing said outbound message channel for further communication activity;
    (c) monitoring the outbound message channel if activity is detected on the outbound message channel;
    (d) detecting and counting the number of outbound messages subsequent to the end of said received message;
    (e) pausing for a period, said period equal to the product of the time period of a single acknowledgement message times the counted number of outbound messages subsequent to said received message; and
    (f) transmitting an acknowledgement message at the expiration of said pause period.

3. The method of claim 2 wherein an imbedded inhibit signal becomes active in the outbound message channel in the presence of activity on the inbound message channel.

4. The method of claim 2 further including the step of transmitting an acknowledgement message immediately if no activity is detected on the outbound message channel.

5. The method of claim 2 further including the step of
(g) monitoring the outbound communications channel before placing a data message on the inbound channel; and
(h) detecting and counting the number of outbound messages observed on the outbound channel;
(i) pausing for a period, said period equal to the product of the time period of a single acknowledgement message times the counted number of outbound messages; and
(j) transmitting said inbound data message at the expiration of said pause period.

* * * * *